United States Patent
Poisson et al.

(10) Patent No.: US 8,276,360 B2
(45) Date of Patent: Oct. 2, 2012

(54) DUAL-PUMP FUEL SYSTEM AND METHOD FOR STARTING A GAS TURBINE ENGINE

(75) Inventors: Richard A. Poisson, Avon, CT (US); Ronald D. Poisson, Longmeadow, MA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 803 days.

(21) Appl. No.: 12/471,092

(22) Filed: May 22, 2009

(65) Prior Publication Data
US 2010/0293919 A1 Nov. 25, 2010

(51) Int. Cl.
*F02C 9/00* (2006.01)
(52) U.S. Cl. ................................. 60/39.281
(58) Field of Classification Search ............ 60/39.281, 60/734, 773, 778, 786
See application file for complete search history.

(56) References Cited

U.S. PATENT DOCUMENTS

| | | | |
|---|---|---|---|
| 3,332,234 A * | 7/1967 | Lavash | 60/39.281 |
| 3,696,612 A | 10/1972 | Berman | |
| 4,607,486 A | 8/1986 | Cole | |
| 4,729,218 A | 3/1988 | Haselbauer et al. | |
| 4,915,593 A | 4/1990 | Cygnor | |
| 4,987,737 A * | 1/1991 | Cantwell | 60/39.281 |
| 5,110,269 A | 5/1992 | Fallon | |
| 5,118,258 A | 6/1992 | Martin | |
| 6,836,086 B1 | 12/2004 | Goldberg et al. | |
| 7,216,487 B2 | 5/2007 | Parsons | |
| 7,845,177 B2 * | 12/2010 | Parsons | 60/773 |
| 2002/0050140 A1 | 5/2002 | Blot-Carretero et al. | |
| 2006/0266047 A1 | 11/2006 | Eick et al. | |
| 2007/0234739 A1 | 10/2007 | Delaloye et al. | |

* cited by examiner

*Primary Examiner* — Phutthiwat Wongwian
(74) *Attorney, Agent, or Firm* — Kinney & Lange, P.A.

(57) ABSTRACT

A dual-pump fuel system for use with a gas turbine engine comprises a fuel metering system, a mechanical fuel pump, an electric fuel pump and an engine controller. The fuel metering system is configured to dispense fuel flow to the engine based on operational needs of the gas turbine engine. The mechanical fuel pump is configured to deliver fuel to the metering system dependent on operational speeds of the engine. The electric fuel pump is configured to deliver fuel directly to the engine independent of operation of the engine. The engine controller is connected to the metering system and the electric fuel pump and is configured to cause the electric fuel pump to deliver fuel to the engine to start and operate the engine until the engine operates the mechanical fuel pump to deliver fuel to the metering system sufficient to sustain operation of the engine.

20 Claims, 2 Drawing Sheets

DUAL-PUMP FUEL SYSTEM AND METHOD FOR STARTING A GAS TURBINE ENGINE

BACKGROUND

The present invention relates to fuel systems for gas turbine engines and, more particularly, to pumps for delivering fuel for combustion. Turbine engines operate by passing a volume of gas through a series of compressors and turbines in order to produce rotational shaft power. The shaft power is used to turn a turbine for driving a compressor to provide air to a combustion process that generates high energy gases. Additionally, the shaft power is used to power a secondary turbine to, for example, drive a generator for producing electricity, or to produce high momentum gases for producing thrust. The compressed air is mixed with a fuel and combusted within the engine to generate high energy gases needed to sustain rotation of the turbines. Initial rotation of the turbines is provided by a starter that operates until the combustion process is initiated. Fuel is delivered to the engine by a fuel system that includes a fuel pump and a fuel metering system.

Typical fuel pumps comprise high pressure, fixed volume gear pumps that require mechanical rotation of the engine to produce fuel flow. As such, during a start up operation of the gas turbine engine, gear pumps are operated through the starter at speeds much lower than operating speeds of the engine. In order to deliver the required volume of fuel to the engine to initiate operation, the gear pump must be sized to have a large displacement. However, once the engine is started and rotating at operating speeds, the displacement of the gear pump provides an excess volume of fuel flow. Part of the fuel flow is dispensed to the engine through the fuel metering system, which reacts to engine needs. The fuel metering system returns excess fuel flow to the fuel system upstream of the fuel pump. The gear pump and the fuel metering system, however, produce inefficiencies in the operation of the gas turbine engine. For example, the gear pump has excess capacity for the needs of most operations of the engine, adding unnecessary size and weight. The fuel metering system adds unnecessary heat to the fuel, which can lead to gumming and coking of the engine.

Various systems have been developed to improve fuel delivery for slow shaft speeds such that mechanical fuel pumps can be reduced in size. For example, hybrid systems use mechanical and electrical pumps to produce multiple fuel flows at different engine speeds. However, such systems still require a fuel metering system to deliver the fuel to the engine at low speeds. Improvements to such systems are needed to reduce overall fuel system size, weight and efficiency.

SUMMARY

The present invention is directed to a dual-pump fuel system for gas turbine engines. The dual-pump fuel system comprises a fuel metering system, a mechanical fuel pump, an electric fuel pump and an engine controller. The fuel metering system is configured to dispense fuel flow to the gas turbine engine based on operational needs of the gas turbine engine. The mechanical fuel pump is configured to deliver fuel to the fuel metering system dependent on operation speeds of the gas turbine engine. The electric fuel pump is configured to deliver fuel directly to the gas turbine engine independent of operation of the gas turbine engine. The engine controller is connected to the fuel metering system and the electric fuel pump and is configured to cause the electric fuel pump to deliver fuel to the gas turbine engine to start and operate the gas turbine engine until the gas turbine engine operates the mechanical fuel pump to deliver fuel to the fuel metering system sufficient to sustain operation of the gas turbine engine. In one embodiment, the electric fuel pump and the mechanical fuel pump are sized such that, at or near a self-sustaining speed of the gas turbine engine, the mechanical fuel pump delivers fuel to the gas turbine engine sufficient to sustain combustion, while the electric fuel pump is insufficient to overcome backpressures generated within the gas turbine engine.

DETAILED DESCRIPTION

Figure 1:
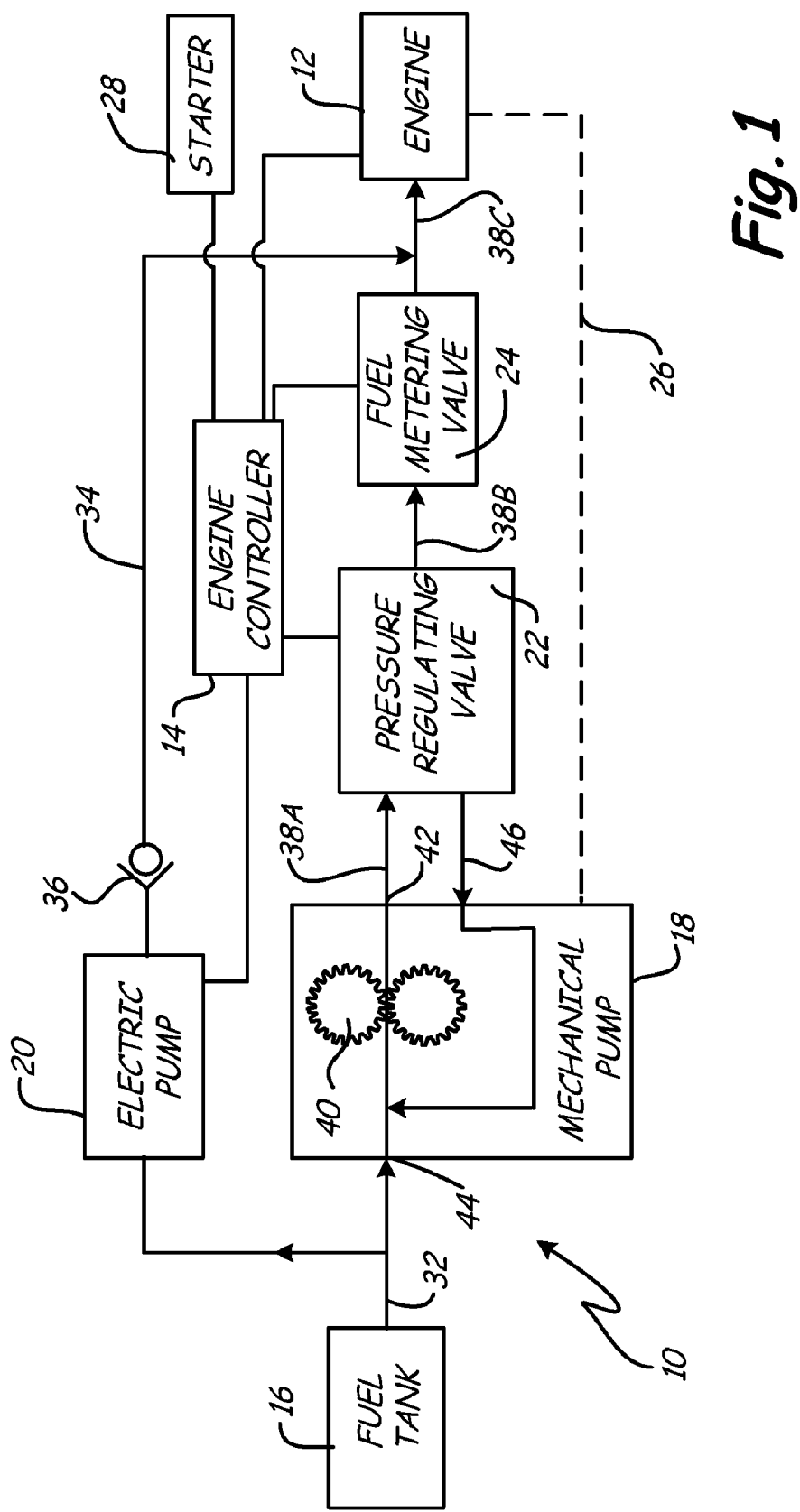
FIG. 1 is a schematic of a dual-pump fuel system for use with a gas turbine engine.

FIG. 1 shows a schematic diagram of dual-pump fuel system 10 for use with gas turbine engine 12. Fuel system 10 and engine 12 are in electronic communication with engine controller 14 to coordinate ignition and combustion of fuel within engine 10. Fuel system 10 includes fuel tank 16, mechanical pump 18, electric pump 20, pressure regulating (PR) valve 22 and fuel metering valve 24. Shaft 26 mechanically couples mechanical pump 16 to engine 12, which is also connected to starter 28. Fuel tank 16 is fluidly connected to mechanical pump 18 and electric pump 20 with fuel line 32. Electric pump 20 is connected to engine 12 with fuel line 34, which includes check valve 36, to deliver a first fuel flow directly to engine 12. Mechanical pump 18 is connected to engine 12 through PR valve 22, fuel metering valve 24 and fuel lines 38A, 38B and 38C to deliver an additional fuel flow to engine 12. Mechanical pump 18 delivers a second fuel flow directly to PR valve 22 through fuel line 38A. PR valve 22 delivers a third fuel flow to fuel metering valve 24 through fuel line 38B. Fuel metering valve 24 delivers a fourth fuel flow to engine 12 through fuel line 38C. Engine controller 14 is connected to starter 28 and electric pump 20 to initiate combustion within engine 12. After combustion is initiated and engine 12 becomes independently operational, rotation of shaft 26 operates mechanical pump 18 to provide fuel sufficient to sustain combustion to PR valve 22 and fuel metering valve 24, operation of which is managed by engine controller 14 to operate engine 12. Operation of starter 28 and electric pump 20 is terminated when mechanical pump 18 becomes sufficiently operational to sustain operation of engine 12.

Fuel tank 16 stores a volume of a fuel to be combusted within engine 12 to generate rotational shaft power. In one embodiment, engine 12 comprises a gas turbine engine suitable for use as a power plant for an aircraft. Fuel tank 16 comprises any suitable storage vessel for use with gas turbine engines, such as a fuel tank located in an aircraft fuselage. As such, it is desirable to reduce the weight and size of components used in conjunction with fuel system 10 and engine 12. Fuel line 32 is split to deliver fuel to both mechanical pump 18 and electric pump 20 from fuel tank 16. Pumps 18 and 20 comprise fixed displacement pumps, the outputs of which are dependent on their operational speeds. Mechanical pump 18 is mechanically powered by operation of engine 12 and shaft 26. Electric pump 20 is electrically powered by a motor driven by a battery or an electrical connection to an external electrical source.

Engine controller 14 can vary delivery of fuel to engine 12 by varying the output of electric pump 20 independent of operation of engine 12 or intervening components. However, engine controller 14, through operation of fuel metering valve 24, is unable produce output of mechanical pump 18 sufficient to initiate and sustain combustion until engine 12 is rotating at operational speeds or at a self-sustaining speed. A gas turbine engine has a rated speed that corresponds to the maximum rotational speed at which the engine will safely operate. A starting speed is any speed at which engine 12 is able to initiate combustion. The starting speed is typically about ten to about twenty-five percent of the rated speed. Ignition of combustion is possible at lower speeds, but at an unreliable rate. A self-sustaining speed is any speed at which engine 12 is able to sustain combustion on its own and operate various electrical and mechanical engine systems. Operating speeds lie between the self-sustaining speed and the rated speed, typically much closer to the rated speed. The capabilities of mechanical pump 18 and electric pump 20 are sized to maximize efficiency of fuel delivery for different operational speeds of engine 12 and the pressures generated at such speeds.

Mechanical pump 18 comprises a fixed displacement pump that is driven by shaft 26. Mechanical pump 18 is connected to shaft 26 through a gear reduction system and a shaft system, such as an accessory drive system. In one embodiment, mechanical pump 18 comprises gear pump 40. The rate at which mechanical pump 18 draws fuel from fuel tank 16 is determined by the displacement of the pumping mechanism, such as the volume between teeth of a gear pump, and the rate at which the pumping mechanism is operated, such as the rotational speed of shaft 26. Thus, the output rate of mechanical pump 18 is directly proportional to the speed of shaft 26. Likewise, the pressure generated by mechanical pump 18 is proportional to the power generated by shaft 26. Modulation of fuel flow from mechanical pump 18 is achieved by control of PR valve 22 and fuel metering valve 24.

Fuel metering valve 24 comprises a mechanism that, through operation by engine controller 14, provides fuel to engine 12 in volumes appropriate for operating conditions. Engine controller 14 is in electronic communication with various sensors and operating systems within engine 12 to determine fuel needs. For example, engine 12 is outfitted with a plurality of temperature and pressure sensors that monitor atmospheric and engine conditions that enable engine controller 14 to monitor fuel conditions such as fuel density. In one embodiment, fuel metering valve 24 is actively controlled by engine controller 14. PR valve 22 comprises a system that reduces fuel flow from what is provided by pump 18 to what is needed by fuel metering valve 24. In one embodiment, PR valve 22 comprises a spring-assisted diaphragm and piston valve. PR valve 22 diverts excess flow of fuel, beyond what is needed by fuel metering valve 24, from outlet 42 of mechanical pump 18 to inlet 44 of mechanical pump 18 through fuel line 46.

PR valve 22 and fuel metering valve 24 together comprise a fuel metering system. Other types of fuel metering systems may also be used with the present invention. Flow between mechanical pump 18 and engine 12 is based on incompressible flow theory, which defines the flow as being proportional to a throat area and the square root of the pressure drop across the throat area. As is known in the art, PR valve 22 maintains a fixed pressure drop across fuel metering valve 24, while engine controller 14 varies the area of a throat within fuel metering valve 24 to control the fuel flow to engine 12. Thus, fuel metering systems become pressurized by operation of engine 12, requiring pressure from fuel system 10 for the fuel metering systems to operate.

Electric pump 20 delivers the first fuel flow directly to engine 12 through fuel line 34. In one embodiment, electric pump 20 comprises a fixed displacement pump operated by an electric motor and a motor speed controller. Thus, the output rate of electric pump 20 is determined by the speed of the electric motor, and the pressure generated by electric pump 20 is determined by the power of the electric motor. Fuel line 34 includes check valve 36, which may comprise a backpressure valve or a minimum pressure valve. When engine 12 is rotating at operating speeds, the pressures within fuel system 10 and engine 12 increase above the pressure that electric pump 20 is able to produce. Check valve 36 prevents backward flow of fuel from engine 12 and fuel system 10 into electric pump 20. In one embodiment, check valve 36 comprises a shutoff solenoid. However, check valve 36 is not needed if electric pump 20 is provided with a suitably sealed housing. Fuel delivery to engine 12 is not dependent on operation of any intervening components, such as engine 12, PR valve 22 or fuel metering valve 24.

As engine 12 rotates at operating speeds, backpressures are generated within fuel system 10 and engine 12 that must be overcome by pressure within the fuel supply, which are generated by mechanical pump 18 and electric pump 20. Specifically, PR valve 22 and fuel metering valve 24 generate a large pressure differential that must be overcome by mechanical pump 18. However, mechanical pump 18 is sized to produce large pressure differentials at higher rotational speeds of engine 12. Specifically, when engine 12 is operating above the starting speed, such as at or near the self-sustaining speed, shaft 26 rotates to produce output of mechanical pump 18 that exceeds fuel demands for operations of engine 12 at pressures above any backpressure generated by engine 12.

In conventional fuel systems, mechanical fuel pumps are sized to produce sufficient fuel flow to engine 12 at the starting speed before combustion is sustained within engine 12. In such systems, the mechanical fuel pump is rotated by a starter that is capable of producing rotation of engine 12 at speeds ten to twenty percent of the rated speed. Thus, the mechanical pump is sized to have a large displacement, which at higher speeds produces a large enough pressure to overcome the pressure differentials produced by fuel metering systems at operating speeds. From a fuel flow standpoint, the mechanical pump is vastly oversized for the operational needs of the engine such that the mechanical pump produces excess waste within system 10. Prior art hybrid systems have attempted to reduce the size of mechanical fuel pumps by including an additional electric fuel pump. However, such electric fuel pumps are configured to operate entirely in parallel with the mechanical fuel pump. Furthermore, such electric fuel pumps still require large power inputs, e.g. high rotational input speeds, to overcome the backpressure produced by the fuel metering system and the gas turbine engine. Thus, electric pumps within prior art hybrid systems have capacities and power requirements well above what is needed to initiate combustion within the gas turbine engine. The electric pump is thereby oversized to produce fuel flow that the engine will not need once the mechanical pump is operating, needlessly increasing weight.

In the present invention, the displacement and size of mechanical pump 18 is scaled down to produce fuel flows closer to the actual needs of engine 12 such that PR valve 22 re-circulates less fuel back to pump 18. Fuel from electric pump 20 is routed directly to engine 12 such that fuel is delivered to engine 12 in quantities sufficient to initiate combustion. However, the size of electric pump 20 is also scaled down because the backpressures produced by PR valve 22 and fuel metering valve 24 do not have to be overcome by pump 20. Furthermore, before engine 12 is operating, there is no backpressure within fuel system 10 and engine 12. Without such backpressures, electric pump 20 can be selected to have a very small rating. In one embodiment, electric pump 20 is driven by a motor having a rating of less than one horsepower (~746 Watts).

Through various operator inputs, such as in an aircraft cockpit, engine controller 14 receives instructions to begin a start-up operation. To initiate ignition and combustion within engine 12, starter 28 is activated by engine controller 14 to produce rotation of engine 12 at a starting speed. Typically, starter 28 comprises a pneumatic or electric starter that is mounted, or otherwise connected, to engine 12 and powered by an external power source, such as a battery or generator. The starting speed is sufficient such that a compressor within engine 12 generates sufficient compressed air to permit combustion within a combustor inside engine 12. Engine controller 14 also activates electric pump 20 to provide fuel to the combustor. Electric pump 20 is sized to provide sufficient fuel to the combustor within engine 12 to permit combustion. While being provided with compressed air and fuel by activation of starter 28 and electric pump 20, engine controller 14 operates igniters within engine 12 to initiate combustion.

The starting speed also produces rotation of shaft 26. Mechanical pump 18 is sized to reduce its weight such that its displacement is insufficient to provide fuel required to initiate and sustain combustion within engine 12 when rotating at the starting speed. As such, PR valve 22 includes a shut-off valve that re-circulates all output of outlet 42 back to inlet 44. Operation of PR valve 22 and the shut-off valve is controlled by engine controller 14.

Using input from sensors provided on engine 12, engine controller determines that combustion within engine 12 has commenced. At such point, operation of starter 28 can be terminated such that speed of engine 12 is able to freely accelerate to speeds above the starting speed. Engine controller 14 operates electric pump 20 to provide increasing flow of fuel to engine 12 by increasing the speed of the electric motor driving electric pump 20 such that the speed of engine 12 increases to near the self-sustaining speed. At such point, the backpressures within engine 12 and fuel system 10 increase to levels beyond what pump 20 and its associated electric motor are able to overcome. However, at such speeds mechanical pump 18 begins to displace a fuel flow sufficient to maintain the self-sustaining speed of engine 12. Thus, engine controller 14 opens the shut-off valve in PR valve 22 such that fuel is provided to fuel metering valve 24.

Through sensors provided on engine 12, engine controller monitors the fuel consumption and demands of engine 12 as well as the total fuel being provided by fuel metering valve 24 and electric pump 20. Engine controller 14 is then able to transition fuel supply to engine 12 from electric pump 20 to fuel metering valve 24 before terminating operation of electric pump 20. If the backpressure generated within engine 12 and fuel system 10 exceeds the pressure that electric pump 20 is capable of producing, engine controller 14 operates shut-off valve 36 to prevent backward flow of fuel through system 10. Thus, at speeds near the self-sustaining speed, engine controller utilizes fuel metering valve 24 to provide fuel to and sustain operation of engine 12, while electric pump 20 is idled.

As demands on engine 12 increase, such as during a take-off operation, fuel metering valve 24 provides additional fuel to engine 12, causing faster rotation of shaft 26. Mechanical pump 18 thus produces additional flow of fuel to meet the needs of engine 12. Mechanical pump 18, however, always provides excess fuel flows to maintain pressure within system 10 and to be able to react to rapidly changing engine conditions. PR valve 22 operates to route excess fuel not needed by fuel metering valve 24 back to inlet 44 of mechanical pump 18.

Thus, electric pump 20 and mechanical pump 18 are configured to operate sequentially, with a brief period of overlapping operation. At low engine speeds, electric pump 20 is operable to provide fuel to engine 12 sufficient to start and sustain operation of engine 12 independent of the speed of engine 12. Output of electric pump 20 is limited by the fuel pressure it is able to generate, which is selected to be less than the backpressure generated in engine 12 at higher speeds such that the size of the electric motor that drives electric pump 20 can be reduced. At high engine speeds, mechanical pump 18 is operable to provide fuel to engine 12 sufficient to sustain combustion at speeds of engine 12 above the starting speed. Output of mechanical pump 18 is limited by its displacement, which is selected be small at lower speeds such that the size of mechanical pump 18 can be reduced.

Efficiency within fuel system 10 and engine 12 is achieved with the present invention by reducing the size of mechanical pump 18 and electric pump 20. First, the reduced size of mechanical pump 18 reduces the weight of fuel system 10, which is desirable in aircraft power plants. Additionally, the smaller size of mechanical pump 18 reduces the volume of fuel that is re-circulated to mechanical pump 18. PR valve 22 takes work out of fuel system 10, thus reducing the efficiency of engine 12. Thus, the less work PR valve 22 is required to do, the more efficient engine 12 becomes. Likewise, the less work PR valve 22 performs, the less heat is added to the fuel as it cycles between PR valve 22 and mechanical pump 18. Excess temperatures of the fuel produces coking that clogs engine 12. Typically, a heat sink, such as a fuel oil heat exchanger connected to fuel line 46, is used to remove heat from hot fuel and other undesirable heat sources within an engine. Removing heat input to the fuel from PR valve 22 makes the heat sink available to meet other engine cooling needs. In one embodiment of the invention, mechanical pump 18 can be sized such that it provides peak fuel flow to PR valve 22 when engine 12 is operating at or near the rated speed. At such sizing, mechanical pump 18 is still able to overcome the backpressures within fuel system 10 developed by PR valve 22 and fuel metering valve 14.

Electric pump 20 is reduced in size and capacity to achieve efficiencies in fuel system 10 and engine 12. Pump 20 (including its associated electric motor) need only be sized to deliver a quantity of fuel to engine 12 sufficient to initiate combustion and increase the speed of engine 12 slightly above the starting speed. Pump 20 (including its associated electric motor) need not be able to overcome the backpressures produced by PR valve 22 and fuel metering valve 24. Thus, the size of both pump 20 and its associated electric motor can be small and lightweight. Furthermore, the electrical demands of fuel system 10 on engine 12 and associated generators are reduced, freeing electrical power for other engine systems.

Figure 2:
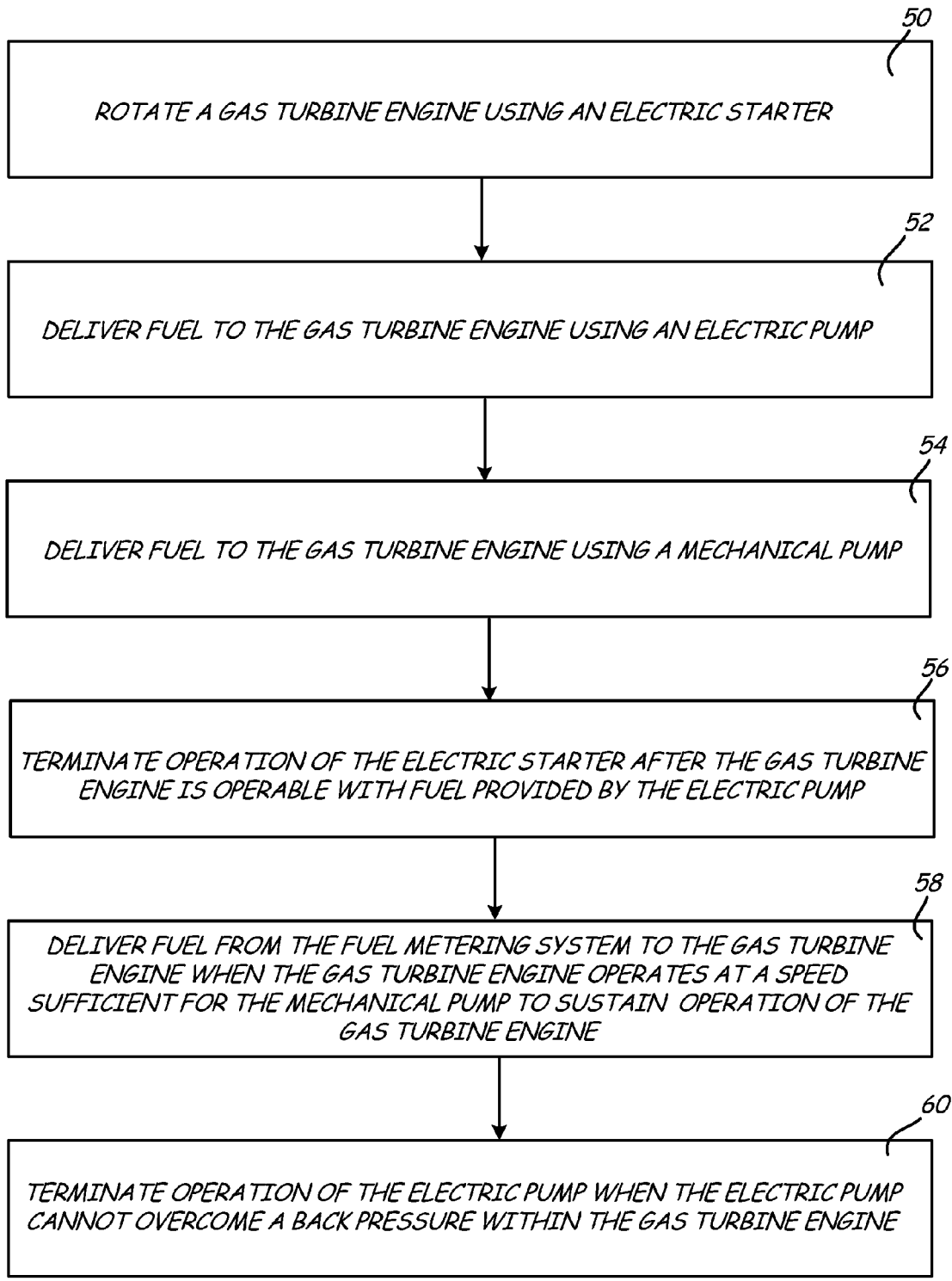
FIG. 2 is a flow chart showing operating steps of the dual-pump fuel system of FIG. 1.

FIG. 2 is a flow chart showing operating steps of dual-pump fuel system 10 of FIG. 1. First, as shown at step 50, engine starter 28 is operated by engine controller 14 to produce rotation of gas turbine engine 12. Starter 28 rotates the gas turbine engine at a starting speed. At step 52, engine controller 14 operates an electric motor to deliver fuel directly to gas turbine engine 12 from electric pump 20. At step 54, gas turbine engine 12 rotates mechanical pump 18 to deliver fuel to a fuel metering system. Within the fuel metering system, PR valve 22 receives fuel from mechanical pump 18 and re-circulates excess fuel flow mechanical pump 18, and fuel metering valve 24 receives fuel from PR valve 22 to modulate fuel flow to gas turbine engine 12. At step 56, operation of starter 28 is terminated when gas turbine engine 12 is able to sustain operation on fuel provided by electric pump 20. Electric pump 20 provides fuel to gas turbine engine 12 so that engine 12 is operable at a self-sustaining speed. At step 58, fuel from the fuel metering system is delivered to gas turbine engine 12 when gas turbine engine 12 operates at a speed sufficient for mechanical pump 18 to sustain operation of engine 12. Mechanical pump 18 is sized to deliver fuel sufficient to sustain operation of engine 12 at speeds near or above the self-sustaining speed. At step 60, operation of electric pump 20 is terminated when electric pump 20 and its associated electric motor cannot overcome backpressure generated by engine 12. Electric pump 20 and its associated electric motor are sized such that when engine 12 generates a backpressure near or above the self-sustaining speed, electric pump 20 and its associated motor cannot overcome the backpressure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A dual-pump fuel system for a gas turbine engine, the fuel system comprising:
    a fuel metering system configured to dispense fuel flow to the gas turbine engine based on operational needs of the gas turbine engine;
    a mechanical fuel pump configured to deliver fuel to the fuel metering system dependent on operational speeds of the gas turbine engine;
    an electric fuel pump configured to deliver fuel directly to the gas turbine engine independent of the fuel metering system and an operation of the gas turbine engine; and
    an engine controller connected to the fuel metering system and the electric fuel pump and configured to cause the electric fuel pump to deliver fuel to the gas turbine engine to start and operate the gas turbine engine until the gas turbine engine operates the mechanical fuel pump to deliver fuel to the fuel metering system sufficient to sustain operation of the gas turbine engine.

2. The dual-pump fuel system of claim 1 wherein the electric fuel pump is driven by an electric motor insufficient to overcome a backpressure generated by the fuel regulating system when the engine is operating at a self-sustaining speed.

3. The dual-pump fuel system of claim 2 wherein a capacity of the mechanical fuel pump is sufficient to provide fuel to start and operate the gas turbine engine only at the self-sustaining speed and above.

4. The dual-pump fuel system of claim 3 and further comprising an electric starter configured to produce starting rotation of the gas turbine engine at a speed sufficient to initiate combustion.

5. The dual-pump fuel system of claim 4 wherein:
    the engine controller is configured to initiate combustion in the gas turbine engine by operating the electric pump to deliver fuel to the gas turbine engine, and operating the starter to produce compressed air in the gas turbine engine at rates sufficient to initiate combustion; and the engine controller is configured to sustain combustion at speeds greater than a starting speed by operating the fuel metering system to control flow from the mechanical fuel pump after terminating operation of the electric fuel pump and the electric starter.

6. The dual-pump fuel system of claim 2 wherein the fuel metering system comprises a fuel metering valve configured to deliver fuel to the gas turbine engine based on engine operating conditions.

7. The dual-pump fuel system of claim 6 wherein the fuel metering system further comprises a pressure regulating valve configured to receive fuel from the mechanical fuel pump and to deliver fuel to the fuel metering valve and excess fuel back to the mechanical fuel pump.

8. The dual-pump fuel system of claim 7 wherein the electric fuel pump comprises a fixed displacement pump connected to an electric motor, and the mechanical fuel pump comprises a fixed displacement gear pump coupled to a shaft of the gas turbine engine.

9. The dual-pump fuel system of claim 8 wherein the electric fuel pump is configured to deliver fuel to the gas turbine engine downstream of an outlet of the fuel metering valve.

10. The dual-pump fuel system of claim 9 and further comprising:
    an electric pump fuel line connecting the electric fuel pump to the gas turbine engine; and
    a plurality of mechanical pump fuel lines connecting, in series, the mechanical fuel pump to the pressure regulating valve, the pressure regulating valve to the fuel metering valve, and the fuel metering valve to the gas turbine engine.

11. A gas turbine engine fuel system comprising:
    a gas turbine engine;
    an electric motor;
    an electric pump configured to produce a first stream of fuel flow proportional to a rotational speed of the electric motor;
    a first fuel line connecting the electric pump to the gas turbine engine;
    a gear pump configured to produce a second stream of fuel flow proportional to a rotational speed of the gas turbine engine;
    a second fuel line connecting the gear pump to the gas turbine engine;
a fuel metering system disposed within the second fuel line for controlling fuel flow from the gear pump to the gas turbine engine; and
    wherein the first fuel line is fluidly coupled to the gas turbine engine downstream from the fuel metering system.

12. The gas turbine engine fuel system of claim 11 and further comprising a starter configured to rotate the gas turbine engine at speeds up to about twenty-five percent of a rated speed of the gas turbine engine.

13. The gas turbine engine fuel system of claim 12 and further comprising an engine controller configured to operate the starter, the electric motor and the fuel metering system.

14. The gas turbine engine fuel system of claim 13 wherein the engine controller initiates combustion in the gas turbine engine by operating the electric pump to deliver fuel to the gas turbine engine and operating the starter to produce compressed air in the gas turbine engine at rates sufficient to initiate combustion.

15. The gas turbine engine fuel system of claim 14 wherein the engine controller sustains combustion at speeds greater than a starting speed by operating the fuel metering system to control flow from the mechanical fuel pump to the gas turbine engine after terminating operation of the electric motor and the electric starter.

16. The gas turbine engine fuel system of claim 12 and further comprising:
- a fuel metering system comprising:
  - a pressure regulating valve; and
  - a fuel metering valve;
- a check valve fluidly positioned between the gas turbine engine and the electric pump; and
- a fuel tank fluidly connected to the gear pump and the electric pump.

17. The gas turbine engine fuel system of claim 11 wherein a capacity of the gear pump is sized to deliver the second stream of fuel flow to the fuel metering system in volumes sufficient to initiate and sustain combustion only when the gas turbine engine is rotating at or above a self-sustaining speed.

18. The gas turbine engine fuel system of claim 17 wherein the electric pump and the electric motor are sized to deliver the first stream of fuel flow to the gas turbine engine in volumes sufficient to initiate combustion when the gas turbine engine is rotating at a starting speed, but are insufficient to overcome a backpressure produced by the fuel metering system when the gas turbine engine is rotating above the self-sustaining speed.

19. A method for delivering fuel to a gas turbine engine, the method comprising:
- delivering fuel directly to a gas turbine engine using an electric pump driven by an electric motor;
- delivering fuel to a fuel metering system using a mechanical pump driven by the gas turbine engine;
- delivering fuel from the fuel metering system to the gas turbine engine only when the gas turbine engine operates at a speed sufficient for the mechanical pump to sustain operation of the gas turbine engine;
- terminating operation of the electric pump when the electric pump cannot overcome a backpressure within the gas turbine engine;
- wherein the fuel delivering directly to the gas turbine engine downstream from fuel metering system.

20. The method of claim 19 and further comprising:
- rotating the gas turbine engine using an electric starter to compress air within the gas turbine engine;
- delivering fuel from the mechanical pump to a pressure regulating valve within the fuel metering system to re-circulate excess fuel capacity to the mechanical pump;
- delivering fuel from the pressure regulating valve to a fuel metering valve within the fuel metering system to modulate fuel flow to the gas turbine engine; and
- terminating operation of the electric starter after the gas turbine engine is operable with fuel provided by the electric pump.

* * * * *